(12) United States Patent
Helf

(10) Patent No.: US 7,950,500 B2
(45) Date of Patent: May 31, 2011

(54) DISC BRAKE, IN PARTICULAR FOR A UTILITY VEHICLE

(75) Inventor: Anton Helf, Soechtenau (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/729,642

(22) Filed: Mar. 23, 2010

(65) Prior Publication Data

US 2010/0230219 A1 Sep. 16, 2010

Related U.S. Application Data

(63) Continuation of application No. PCT/EP2007/008267, filed on Sep. 24, 2007.

(51) Int. Cl.
*F16D 66/02* (2006.01)

(52) U.S. Cl. .......... 188/1.11 L; 188/71.9; 188/196 BA; 340/454

(58) Field of Classification Search ............. 188/1.11 R, 188/1.11 W, 1.11 L, 1.11 E, 71.7, 71.8, 71.9, 188/196 B, 196 BA; 340/453, 454
See application file for complete search history.

(56) References Cited

U.S. PATENT DOCUMENTS

| 6,129,183 | A * | 10/2000 | Ward | 188/1.11 W |
| 6,276,494 | B1 * | 8/2001 | Ward et al. | 188/1.11 W |
| 6,479,987 | B1 | 11/2002 | Marx et al. | |
| 6,820,730 | B2 * | 11/2004 | Angerfors | 188/71.9 |
| 7,240,774 | B2 * | 7/2007 | Kramer | 188/71.9 |

FOREIGN PATENT DOCUMENTS

| DE | 93 12 119 U1 | 2/1994 |
| DE | 198 17 356 A1 | 10/1999 |
| DE | 42 30 831 B4 | 2/2004 |
| DE | 10 2005 053 303 A1 | 5/2007 |
| DE | 10 2006 042 777 B3 | 10/2007 |
| EP | 0 492 143 A1 | 7/1992 |
| EP | 0 566 006 B1 | 10/1993 |
| EP | 0 659 243 B1 | 6/1995 |
| EP | 1 519 157 A2 | 3/2005 |
| WO | WO 2007/140985 A1 | 12/2007 |

OTHER PUBLICATIONS

Translation of EP 0566006 A1, Hirschler et al., published Oct. 1993.*
International Search Report dated May 21, 2008 with English translation (six (6) pages).

* cited by examiner

*Primary Examiner* — Thomas J Williams
(74) *Attorney, Agent, or Firm* — Crowell & Moring LLP

(57) ABSTRACT

A disc brake, in particular, for a commercial vehicle, has a brake caliper which engages over a brake disc, brake linings which make contact with the brake disc in a functional position, and a brake application device with which one of the brake linings can be pressed, via at least one adjusting spindle, against the brake disc. An adjustment device is rotationally fixed to the adjusting spindle, by which wear-induced change in the running clearance between the brake lining and the brake disc can essentially be compensated. A closure lid covers the adjustment device and is attached to the brake caliper. A lining wear sensor communicates with a step-down gear mechanism connected to the adjusting spindle. The lining wear sensor is embodied as a contactless sensor which rotates on a concentric path has its change in angular position detected by the lining wear sensor and transmitted to an evaluation device.

13 Claims, 5 Drawing Sheets

DISC BRAKE, IN PARTICULAR FOR A UTILITY VEHICLE

CROSS-REFERENCE TO RELATED APPLICATION

This application is a continuation of PCT International Application No. PCT/EP2007/008267, filed Sep. 24, 2007, the entire disclosure of which is herein expressly incorporated by reference.

BACKGROUND AND SUMMARY OF THE INVENTION

The invention relates to a disc brake, in particular for a commercial vehicle.

In order to maintain a constant running clearance, also referred to as the working travel, between the brake disc and the brake linings in the non-functioning position of the brake linings, that is, in order to compensate for the wear produced by the removal of friction material of the brake linings during braking, a known disc brake is provided, at least on its brake-application side, with an adjustment device. The adjustment device conventionally includes two adjusting spindles which can be rotated synchronously by way of a common drive chain and are thereby axially displaceable toward the brake disc.

In order to detect brake lining wear, use is made of devices consisting of a reduction gear mechanism connected to the two adjusting spindles, and a lining wear sensor connected to the reduction gear mechanism. A device of this type is known from DE 93 12 119 U1.

It is proposed in DE 93 12 119 U1 to use as the brake wear sensor a rotational angle sensor in the form of a rotary potentiometer. The condition of the brake lining is detectable, for example for the driver of the commercial vehicle, via a connected evaluation device.

In order to obtain an accurate indication, the position of the brake lining, i.e., the brake pad, with respect to the positioning of the brake wear sensor must be made very precise, so that careful and precise assembly is required. Naturally, this is possible only with considerable manufacturing cost and complexity, which conflicts with the economical production of a disc brake as a whole.

Furthermore, the replacement of a defective lining wear sensor is also possible only with considerable cost and complexity, especially with regard to the positioning of the lining wear sensor in relation to the brake lining and to the position of the reduction gear mechanism. An exchange of the lining wear sensor can therefore be carried out only by appropriately trained personnel, which, however, again conflicts with the desirability of lowering the operating costs.

It is therefore the object of the invention to develop a disc brake that can be assembled in a simpler and more economical manner and that have a lining wear sensor that can be exchanged without difficulty.

This and other objects are achieved by a disc brake, in particular for a commercial vehicle, having a brake caliper which engages over a brake disc, brake linings which contact the brake disc in an operating position, a brake application device with which one of the brake linings can be pressed against the brake disc via at least one adjusting spindle, and a wear adjustment device which is connected in a rotationally fixed manner to the adjusting spindle and with which a wear-induced change in a running clearance between the brake lining and the brake disc can be substantially compensated. A closure lid covers the wear-adjustment device and is fastened to the brake caliper. A lining wear sensor communicates with a reduction gear mechanism connected to the adjusting spindle. Connected to the reduction gear mechanism is a transmitter revolving on a concentric path and communicating with the lining wear sensor. The lining wear sensor is operatively configured as a contactless sensor by which a change in the angular position of the transmitter is detectable and transmittable to an evaluation device.

This design configuration produces advantageously a constructional separation of the lining wear sensor and the reduction gear mechanism; that is, the two elements are no longer physically connected to one another.

As a result, there are a large number of advantages; in particular, the invention provides a disc brake design of minimal complexity and cost.

For example, according to the invention, it becomes possible to have an automated assembly, since the reduction gear mechanism, the chain and the chain wheels which can be fitted to the respective adjusting spindles, can be combined and installed practically as a constructional unit. The closure lid then need only be fitted and screwed to the brake caliper. The lining wear sensor is then fastened to the outside of the closure lid, in which case the reduction gear mechanism and the lining wear sensor are preferably separated by a wall of the closure lid.

Isolation of the reduction gear mechanism and the chain from the outside region is thereby achieved. The lining wear sensor can therefore be installed and removed without intervention in the reduction gear mechanism, while the wear of the brake lining can be detected by the lining wear sensor in conjunction with the transmitter, depending on the position of the transmitter, which is also covered by the closure lid.

However, as already known from the prior art, a precondition for such detection is that the reduction gear mechanism, for example in the form of an epicyclic gear, is designed in such a manner that a rotation of the transmitter does not exceed 360°, preferably 300°, over the full wear travel. That is to say that while the adjusting spindle performs, for example, seven revolutions in order to compensate for the maximum wear travel, the transmitter rotates only once through not more than 300°.

In order to ensure unimpeded communication between the transmitter and the lining wear sensor, the transmitter rests without free play against the wall of the closure lid while the lining wear sensor bears without a gap against the opposite side of the wall.

The transmitter is preferably pressed against the wall of the closure lid under spring loading, for which purpose a compression spring is arranged in a hollow wheel of the epicyclic gear, the other end of the compression spring bearing against a planet wheel carrier. A carrier wheel to which the transmitter is fastened is retained in a rotationally fixed manner on the hollow wheel. Through the arrangement of the compression spring in the hollow wheel, an extremely low overall installed height of the reduction gear mechanism is achieved, complying with the requirement for a compact structure of the disc brake.

As a contactless sensor, the lining wear sensor may vary in construction and in operating principle. For example, the functional unit of the contactless sensor/transmitter may operate on a magnetic basis or inductively. It is also possible to implement the contactless sensor in the form of a transponder.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
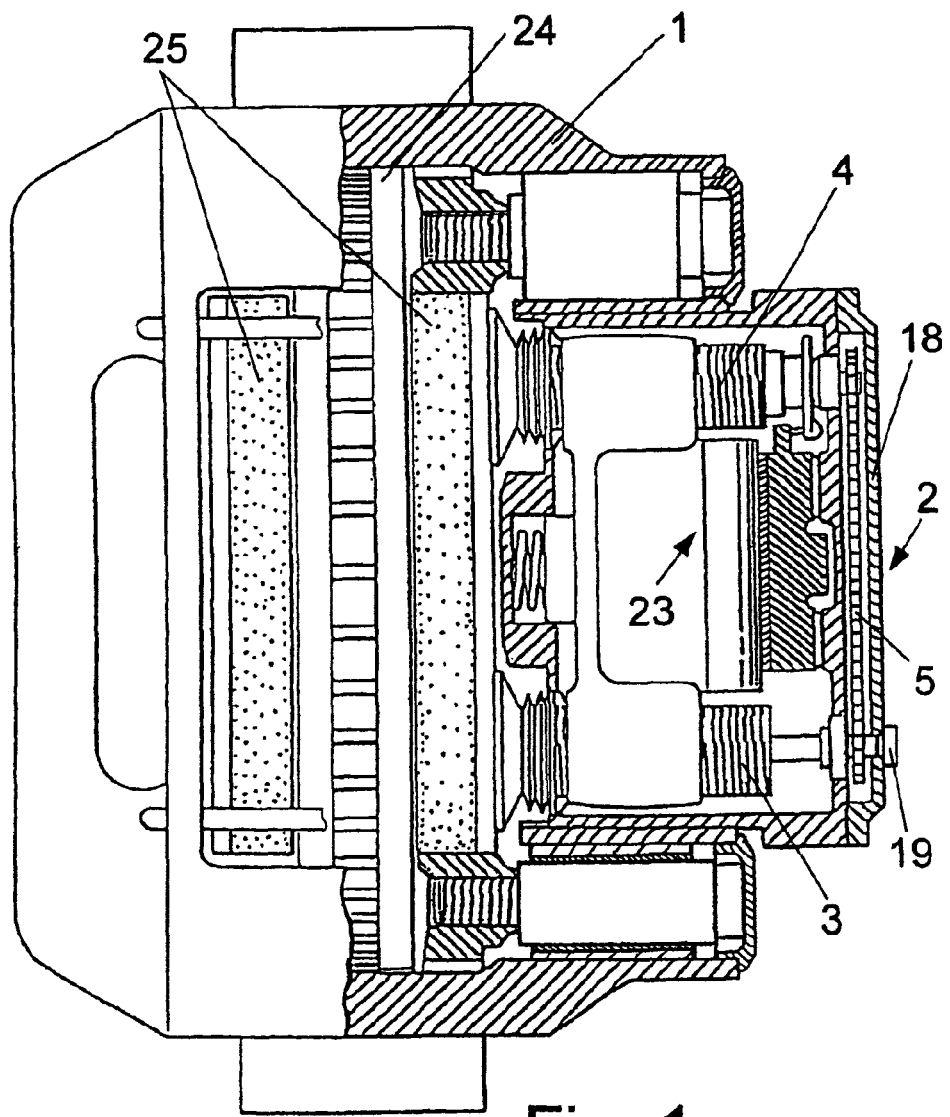
FIG. 1 is a schematic diagram of the structure of a disc brake according to the invention in a partially sectional top view.

FIG. 1 shows a disc brake, in particular for a commercial vehicle, with a brake caliper 1 that engages or straddles over a brake disc 24, brake linings 25 arranged on each side of the brake disc 24 and contacting same during braking, and a brake application device 23 with which the brake lining 25 on the brake-application side can be pressed against the brake disc 24. The application pressure is transmitted from the brake application device 23 to the brake lining 25 by two adjusting spindles 3, 4. A wear-adjustment device 2, substantially compensates for a wear-induced change in the running clearance between the brake lining 25 and the brake disc 24. The adjustment device 2 is arranged in a rotationally fixed manner on an adjusting spindle 3.

Figure 2:
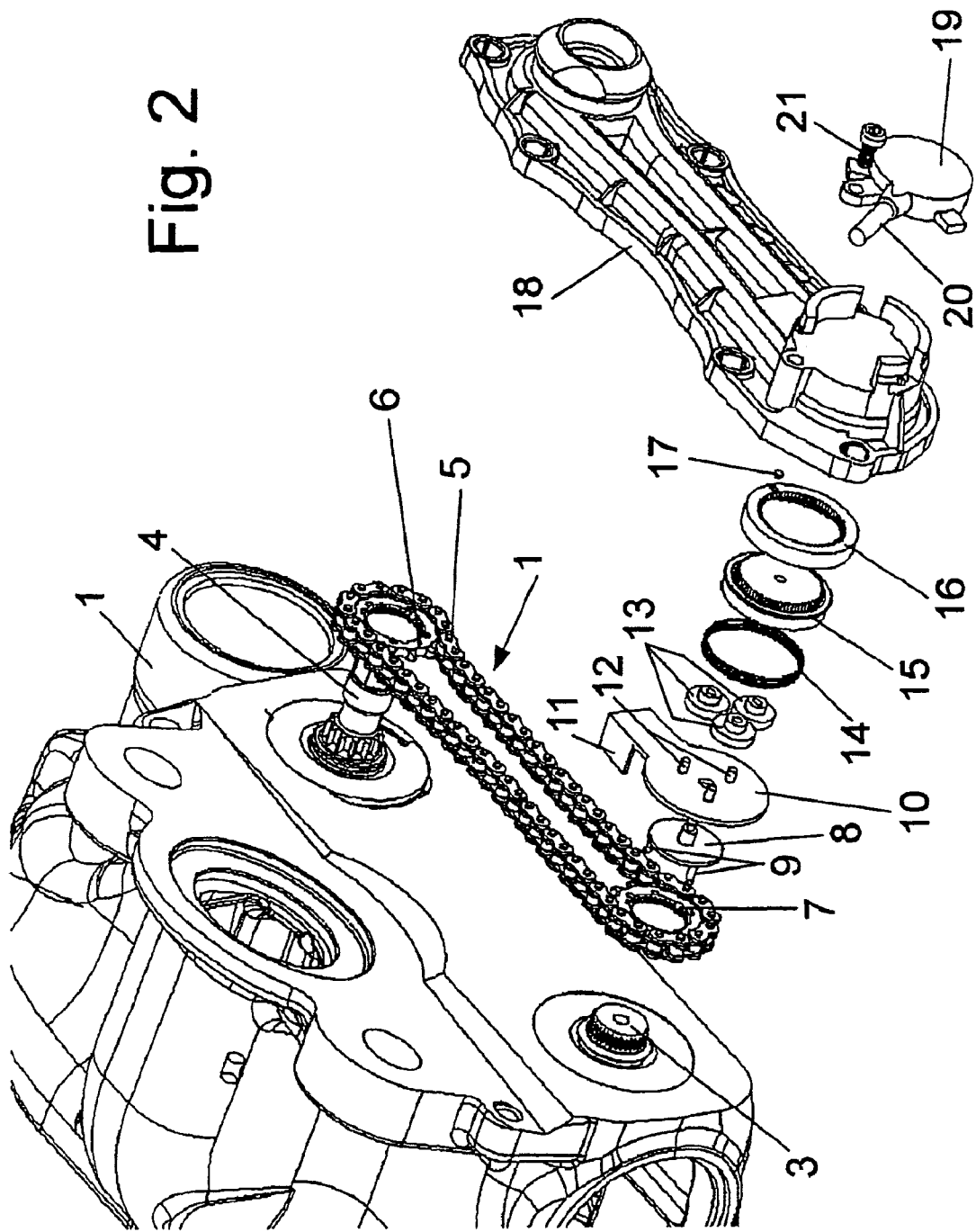
FIGS. 2-4 each show an exploded view of a partial detail of the inventive disc brake in different assembly positions.
Figure 3:
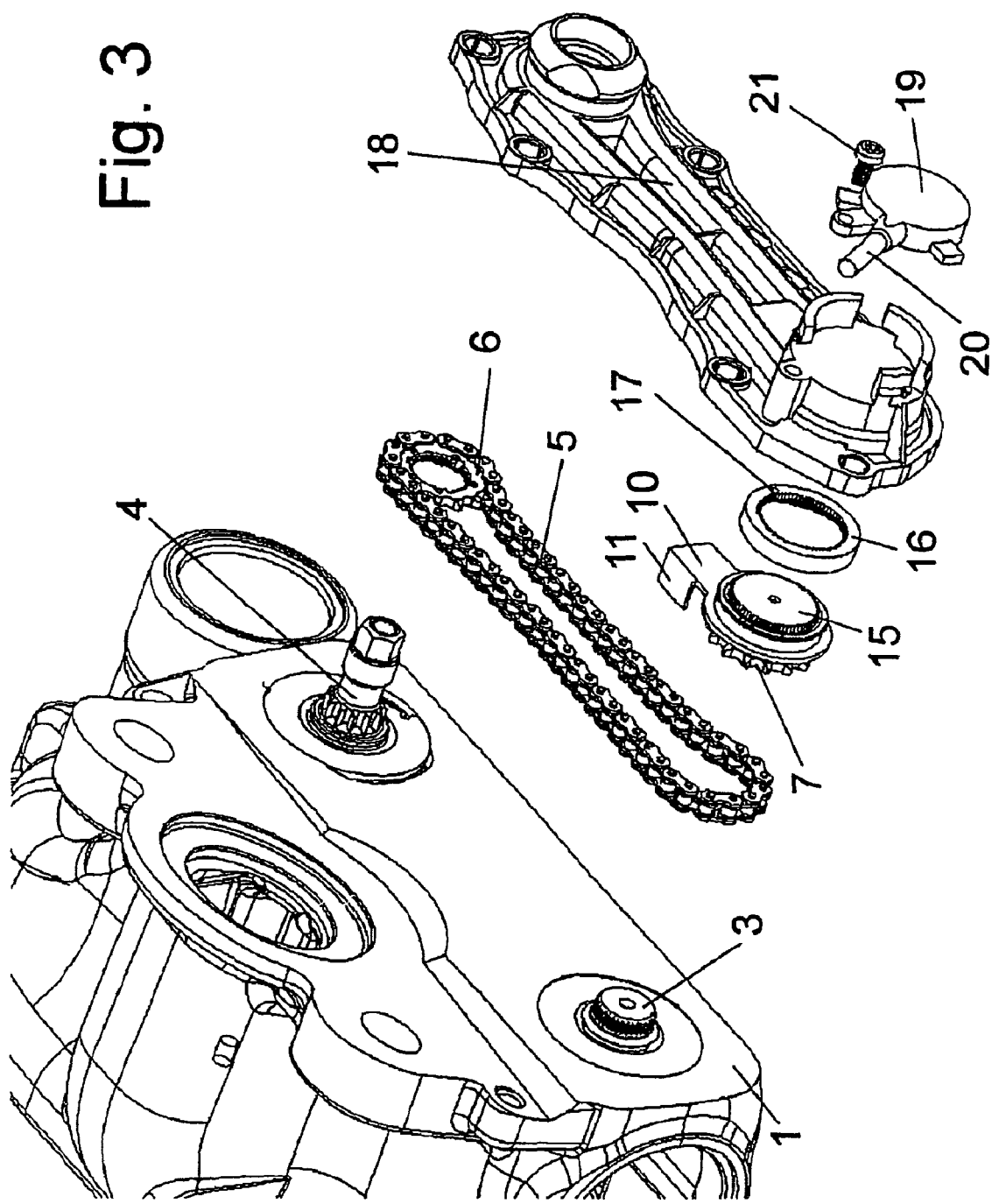
Figure 4:
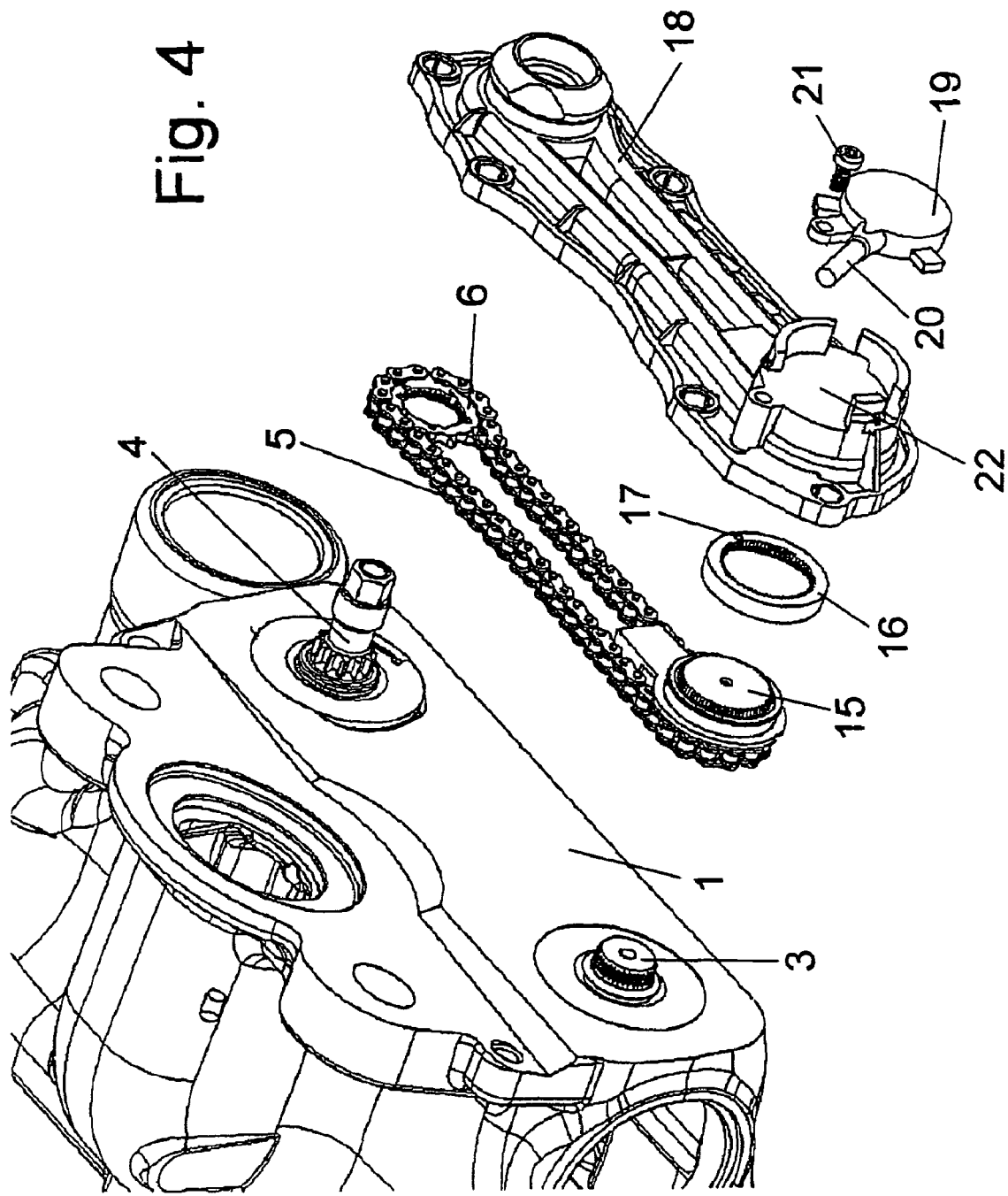

Referring to FIGS. 2 and 3, for synchronized adjustment of the adjusting spindles 3, 4 in order to compensate wear travel, the spindles 3, 4 are coupled to one another via a chain drive which consists of chain wheels 6, 7 connected in a rotationally fixed manner to the associated adjusting spindle 3, 4, and a chain 5.

The adjustment device 2 is covered with respect to the environment by a closure lid 18 which is screwed to the brake caliper 1. The disc brake further has a lining wear sensor 19 communicating with a reduction gear mechanism connected to the adjusting spindle 3. Because the operation of the disc brake is known per se, description thereof is dispensed with, or reference is made to DE 93 12 119 U1 mentioned above.

The reduction gear mechanism is in the form of an epicyclic gear and has a sun wheel 8 which has axially disposed locking arms 9 with which the sun wheel 8 can be fastened to the chain wheel 7 associated with the actuation spindle 3. FIG. 2 shows an exploded view of the assembly position in which all the components are inoperative.

The sun wheel 8 is therefore first connected to the chain wheel 7 in a rotationally and axially secured manner by way of clips, the locking arms 9 engaging in corresponding openings of the chain wheel 7. Alternatively, the sun wheel 8 may be connected to the adjusting spindle 3 directly, or via a plug-in toothing, in a rotationally fixed manner.

Fitted to the sun wheel 8 is a planet wheel carrier 10, which is provided with wings 11 extending laterally to the free sections of the chain 5 (those sections not in contact with the wheel 7), on which wings 11 the chain sections are supported. The planet wheel carrier 10 has three axially-extending journal pins 12, on each of which a planet wheel 13 is fitted. A hollow wheel 15, which engages with the planet wheels 13, is placed thereon.

Figure 5:
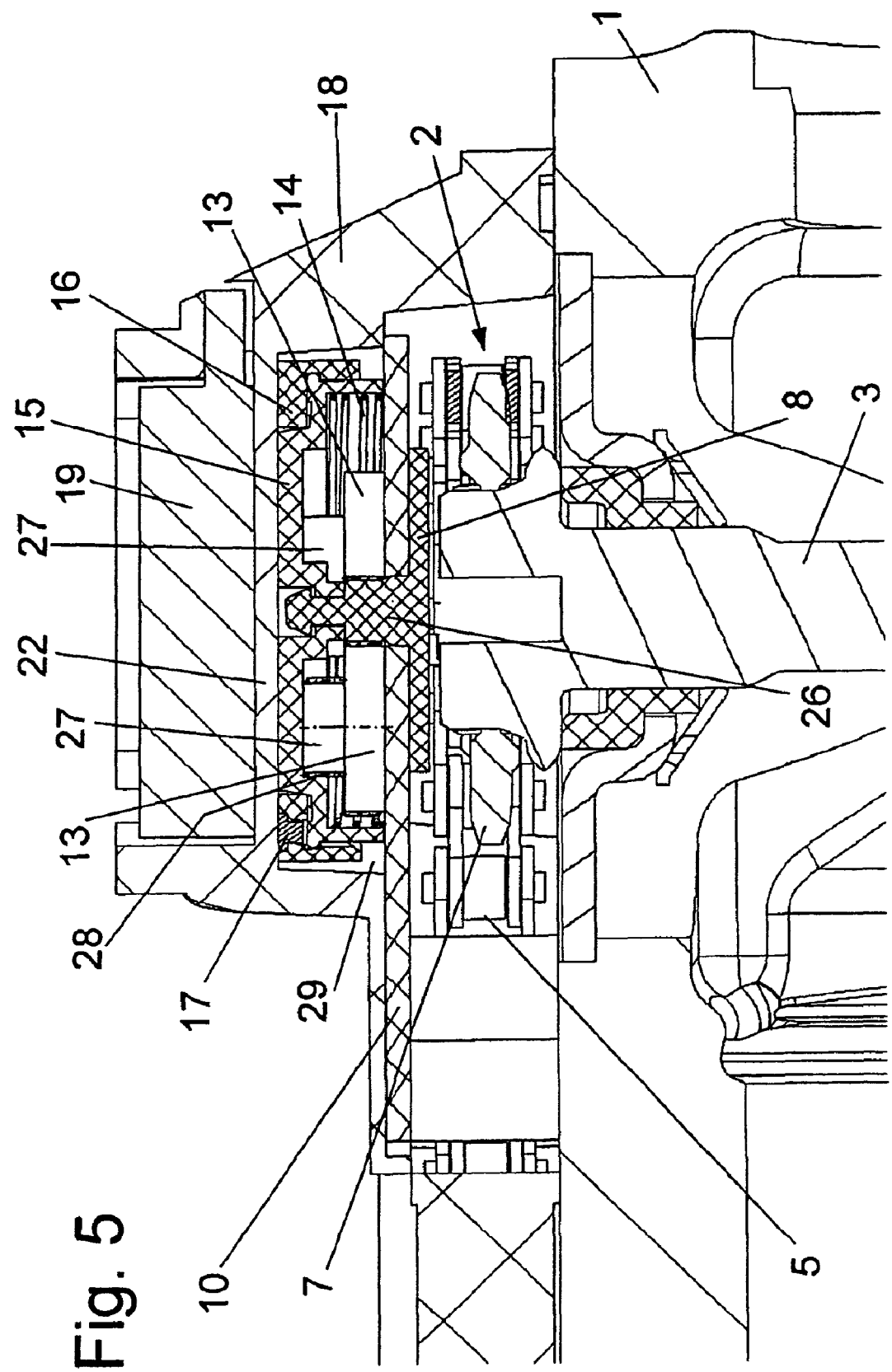
FIG. 5 is a partial detail of a disc brake in a sectional top view.

For transmission of the torque of the adjusting spindle 3, as is shown very clearly in FIG. 5, a journal 26 of the sun wheel 8 is provided with an external toothing with which the toothings of the stepped planet wheels 13 engage with their larger diameter. The output drive is effected via a shoulder 27 having a smaller diameter, also provided with an external toothing, which external toothing meshes with teeth provided on a concentric circumferential face 28 of a recess in the hollow wheel 15.

A carrier wheel 16, which has in its outer edge region a transmitter 17 that communicates with the lining wear sensor 19, is fitted in a rotationally fixed manner on the hollow wheel 15.

The hollow wheel 15, the planet wheels 13 and the carrier wheel 16 are located in a receiving chamber 29 of the closure lid 18. The receiving chamber 29 is bounded on one side by a wall 22 of the closure lid 18 and on the opposite side by the planet wheel carrier 10.

The wall 22 provides a spatial separation of the transmitter 17 and the entire reduction gear mechanism from the lining wear sensor 19. The lining wear sensor is in the form of a contactless sensor and is retained in a rotationally fixed manner on the closure lid 18 by way of a fastener such as a screw 21. The fastening of the lining wear sensor 19 to the closure lid 18 is effected, for example, by way of a bayonet connection.

For operational reliability of the transmitter 17/lining wear sensor 19 system, the transmitter 17 must rest without play against the wall 22, for which purpose there is associated with the hollow wheel 15 a compression spring 14 with which the hollow wheel 15, and therefore the carrier wheel 16 and the transmitter 17 fastened therein, are pressed against the wall 22.

For rotationally fixing the carrier wheel 16 to the hollow wheel 15, both wheels have form-fitting mechanisms, preferably toothings, which engage with one another.

FIG. 3 shows that the chain wheel 7, the planet wheel carrier 10, the planet wheels 13, the sun wheel 8, the compression spring 14 and the hollow wheel 15 are combined into a constructional unit over which the chain 5 is placed, as is also done with respect to the other chain wheel 6.

The unit preassembled in this way can be fitted to the adjusting spindles 3, 4. The adjusting spindles 3, 4 are connected positively and in a rotationally fixed manner by toothings to the associated chain wheels 6, 7.

The closure lid 18 is then placed on the brake caliper 1 and fastened thereto, preferably by use of threaded fasteners. Finally, the lining wear sensor 19 is fitted to the outside of the closure lid 18, fastened thereto and connected via a cable connection 20 to an evaluation device by which changes in the angular position of the transmitter 17 can be detected.

TABLE OF REFERENCES NUMERALS

1 Brake caliper
2 Adjustment device
3 Adjusting spindle
4 Adjusting spindle
5 Chain
6 Chain wheel
7 Chain wheel
8 Sun wheel
9 Locking arms
10 Planet wheel carrier
11 Wing
12 Journal pin
13 Planet wheel
14 Compression spring
15 Hollow wheel
16 Carrier wheel
17 Transmitter
18 Wear lid
19 Lining wear sensor
20 Cable connection
21 Threaded fastener
22 Wall 23 Brake application device
24 Brake disc
25 Brake lining
26 Journal
27 Shoulder
28 Circumferential face
29 Receiving chamber The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake assembly for use with a brake disc, comprising:
    a caliper operatively configured to be engageable over the brake disc;
    a brake application device by which a brake lining is pressable against the brake disc through at least one adjusting spindle;
    a wear adjustment device connected in a rotationally fixed manner to the adjusting spindle, the wear-adjustment device substantially compensating for wear-induced changes in a running clearance between the brake lining and the brake disc;
    a closure lid that covers the wear-adjustment device and is fastened to the caliper;
    a reduction gear mechanism connected to the adjusting spindle;
    a transmitter operatively configured to revolve on a concentric path, the transmitter being connected to the reduction gear mechanism;
    a contactless lining wear sensor operatively configured to detect a change in angular position of the transmitter, and to provide an output indicative of the change in angular position of the transmitter;
    wherein the reduction gear mechanism comprises an epicyclic gear;
    wherein the epicyclic gear comprises a sun wheel and the wear-adjustment device comprises a chain wheel, the sun wheel being fastened in a rotationally fixed manner to the chain wheel; and
    wherein the sun wheel has locking arms operatively configured to engage in corresponding openings of the chain wheel.

2. The disc brake according to claim 1, further comprising an evaluation device coupled to receive the output of the contactless lining wear sensor.

3. The disc brake according to claim 1, wherein the epicyclic gear includes a hollow wheel, the transmitter being fastened directly or indirectly to the hollow wheel.

4. The disc brake according to claim 3, wherein the reduction gear mechanism further comprises a carrier wheel connected to the hollow wheel, the transmitter being arranged in the carrier wheel.

5. The disc brake according to claim 1, wherein the closure lid comprises a wall physically separating the reduction gear mechanism and the lining wear sensor.

6. The disc brake according to claim 1, wherein the reduction gear mechanism, chain wheels of the wear-adjustment device, and a chain of the wear-adjustment device are preassembled as a constructional unit operatively configured to be installed on the adjusting spindles.

7. The disc brake according to claim 1, wherein the disc brake is a commercial vehicle disc brake.

8. A disc brake assembly for use with a brake disc, comprising:
    a caliper operatively configured to be engageable over the brake disc;
    a brake application device by which a brake lining is pressable against the brake disc through at least one adjusting spindle;
    a wear adjustment device connected in a rotationally fixed manner to the adjusting spindle, the wear-adjustment device substantially compensating for wear-induced changes in a running clearance between the brake lining and the brake disc;
    a closure lid that covers the wear-adjustment device and is fastened to the caliper;
    a reduction gear mechanism connected to the adjusting spindle;
    a transmitter operatively configured to revolve on a concentric path, the transmitter being connected to the reduction gear mechanism;
    a contactless lining wear sensor operatively configured to detect a change in angular position of the transmitter, and to provide an output indicative of the change in angular position of the transmitter;
    wherein the closure lid comprises a wall physically separating the reduction gear mechanism and the lining wear sensor; and
    wherein the transmitter is pressed under spring loading against one side of the wall of the closure lid.

9. The disc brake according to claim 8, wherein the reduction gear mechanism further comprises a carrier wheel connected to the hollow wheel, the transmitter being arranged in the carrier wheel.

10. The disc brake according to claim 9, wherein the spring loading is provided by a compression spring operatively configured to press the hollow wheel and the carrier wheel formed as a constructional unit against the one side of the wall of the closure lid, the compression spring being arranged in the hollow wheel.

11. A disc brake assembly for use with a brake disc, comprising:
    a caliper operatively configured to be engageable over the brake disc;
    a brake application device by which a brake lining is pressable against the brake disc through at least one adjusting spindle;
    a wear adjustment device connected in a rotationally fixed manner to the adjusting spindle, the wear-adjustment device substantially compensating for wear-induced changes in a running clearance between the brake lining and the brake disc;
    a closure lid that covers the wear-adjustment device and is fastened to the caliper;
    a reduction gear mechanism connected to the adjusting spindle;
    a transmitter operatively configured to revolve on a concentric path, the transmitter being connected to the reduction gear mechanism;
    a contactless lining wear sensor operatively configured to detect a change in angular position of the transmitter, and to provide an output indicative of the change in angular position of the transmitter;
    wherein the reduction gear mechanism comprises an epicyclic gear; and
    wherein the epicyclic gear comprises a planet wheel carrier, the planet wheel carrier having two wings disposed parallel to and at a distance from one another in order to support free sections of a chain of the wear-adjustment device.

12. A lining wear sensor system for a commercial vehicle disc brake, the system comprising:
   a reduction gear mechanism operatively adapted for an adjusting spindle of a brake application device of the commercial vehicle disc brake;
   a transmitter operatively configured in or on the reduction gear mechanism to revolve about a concentric path;
   a contactless sensor for detecting a change in angular position of the transmitter and outputting a signal indicative thereof;
   a cover for the reduction gear mechanism, the cover being operatively configured to be fastened to a caliper of the commercial vehicle disc brake; and
   a wall of the cover physically separating the transmitter from the contactless sensor.

13. The system according to claim 12, wherein the reduction gear mechanism is operatively designed such that the transmitter rotates less than 360° over a full wear travel for the commercial vehicle disc brake.

* * * * *